(12) United States Patent
Sarin (10) Patent No.: US 10,922,156 B2
(45) Date of Patent: Feb. 16, 2021

(54) SELF-EXECUTING BOT BASED ON CACHED USER DATA

(71) Applicant: PayPal, Inc., San Jose, CA (US)

(72) Inventor: Pankaj Sarin, Elkhorn, NE (US)

(73) Assignee: PAYPAL, INC., San Jose, CA (US)

( * ) Notice: Subject to any disclaimer, the term of this patent is extended or adjusted under 35 U.S.C. 154(b) by 50 days.

(21) Appl. No.: 16/024,043

(22) Filed: Jun. 29, 2018

(65) Prior Publication Data
US 2020/0004611 A1    Jan. 2, 2020

(51) Int. Cl.
| | | |
|---|---|---|
| G06F 9/54 | (2006.01) | |
| G06F 12/0802 | (2016.01) | |
| H04L 12/58 | (2006.01) | |
| G06Q 10/08 | (2012.01) | |
| G06Q 50/00 | (2012.01) | |
| G06F 16/9537 | (2019.01) | |

(52) U.S. Cl.
CPC .......... *G06F 9/546* (2013.01); *G06F 12/0802* (2013.01); *G06F 16/9537* (2019.01); *G06Q 10/087* (2013.01); *G06Q 50/01* (2013.01); *H04L 51/02* (2013.01); *G06F 2212/154* (2013.01)

(58) Field of Classification Search
CPC ....................................................... G06F 9/546
USPC .......................................................... 719/313
See application file for complete search history.

(56) References Cited

U.S. PATENT DOCUMENTS

| | | | |
|---|---|---|---|
| 8,726,082 B2* | 5/2014 | Moore ................ | G06F 11/1443 714/18 |
| 10,366,442 B1* | 7/2019 | Oczkowski ........ | G06Q 30/0631 |
| 2012/0284138 A1* | 11/2012 | Shave ................ | G06Q 30/0207 705/26.3 |
| 2014/0249917 A1* | 9/2014 | Groarke ................ | G06Q 30/01 705/14.53 |

* cited by examiner

*Primary Examiner* — Andy Ho
(74) *Attorney, Agent, or Firm* — Haynes and Boone, LLP (57) ABSTRACT

Cached data is obtained from a device. The cached data includes data saved on the device in response to electronic searches or electronic messaging performed by a user using the device. A determination is made, at least in part via the cached data, regarding an intended use context associated with the electronic searches or the electronic messaging. Using the intended use context, a confidence level is determined. In response to the determined confidence level meeting or exceeding a predefined threshold, a transaction involving the user is automatically executed, or an electronic communication is automatically sent on behalf of the user.

20 Claims, 6 Drawing Sheets

SELF-EXECUTING BOT BASED ON CACHED USER DATA

BACKGROUND

Field of the Invention

The present invention generally relates to database management, and more particularly to automatically executing tasks based on a cached data from a database, according to various embodiments.

Related Art

Rapid advances have been made in the past several decades in the fields of computer technology and telecommunications, and businesses and end users now engage in electronic activities more than ever. As a user engages in electronic activities such as web browsing, online chatting, running searches using a search engine, or posting messages on electronic social media, cached data may be saved in databases or other storage means as a result of these electronic activities. However, conventional systems have not sufficiently taken advantage of the user's cached data. What is needed is a system and method to automatically execute certain tasks on behalf of the user based on the cached data.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to systems and methods of automatically executing certain tasks on behalf of a user based on the user's cached data. For example, cached data may be saved in a database or other storage means in response to various activities of the user, such as the user browsing the web, chatting or texting online, running searches via a search engine, viewing digital content, or posting messages on electronic social media. The cached data may be saved locally in a device of a user, and/or remotely on a server. Cached data has not been sufficiently utilized in conventional devices or systems, such as in relation to user online activities. For example, a user may search for a product—thereby indicating a desire for a potential purchase—but did not follow through with a purchase for whatever reason. The search for the product may be saved as cached data. However, conventional devices or systems have not sufficiently utilized the cached data to perform tasks on behalf of the user.

In comparison, the devices and systems of the present disclosure will not only save the cached data, but will also analyze the cached data to determine an intended use context. For example, repeated searches for a product on a merchant's website may indicate that the user would like to purchase the product. In some embodiments, the present disclosure utilizes an intelligent self-executing bot to calculate a confidence level for an intended use context based on the cached data. If the confidence level meets or exceeds a predefined confidence level, the bot will automatically execute one or more tasks on behalf of the user, for example purchasing the product on a merchant's website on behalf of the user. Of course, it is understood that the automatic purchasing of a product is merely one of many of the self-execution capabilities of the bot and is not intended to be limiting. As a result, computing resources may be reduced as the system no longer needs to receive requests from the user, process such requests, and engage in any additional processing associated with the initial request. Further, computing resources for the user device are also reduced, as the user no longer needs to engage user interfaces and utilize communication protocols for sending a request and engaging in the communications associated with the request. Other improvements to computer systems are also discussed herein. The various aspects of the present disclosure are discussed in more detail with reference to FIGS. 1-6.

Figure 1:
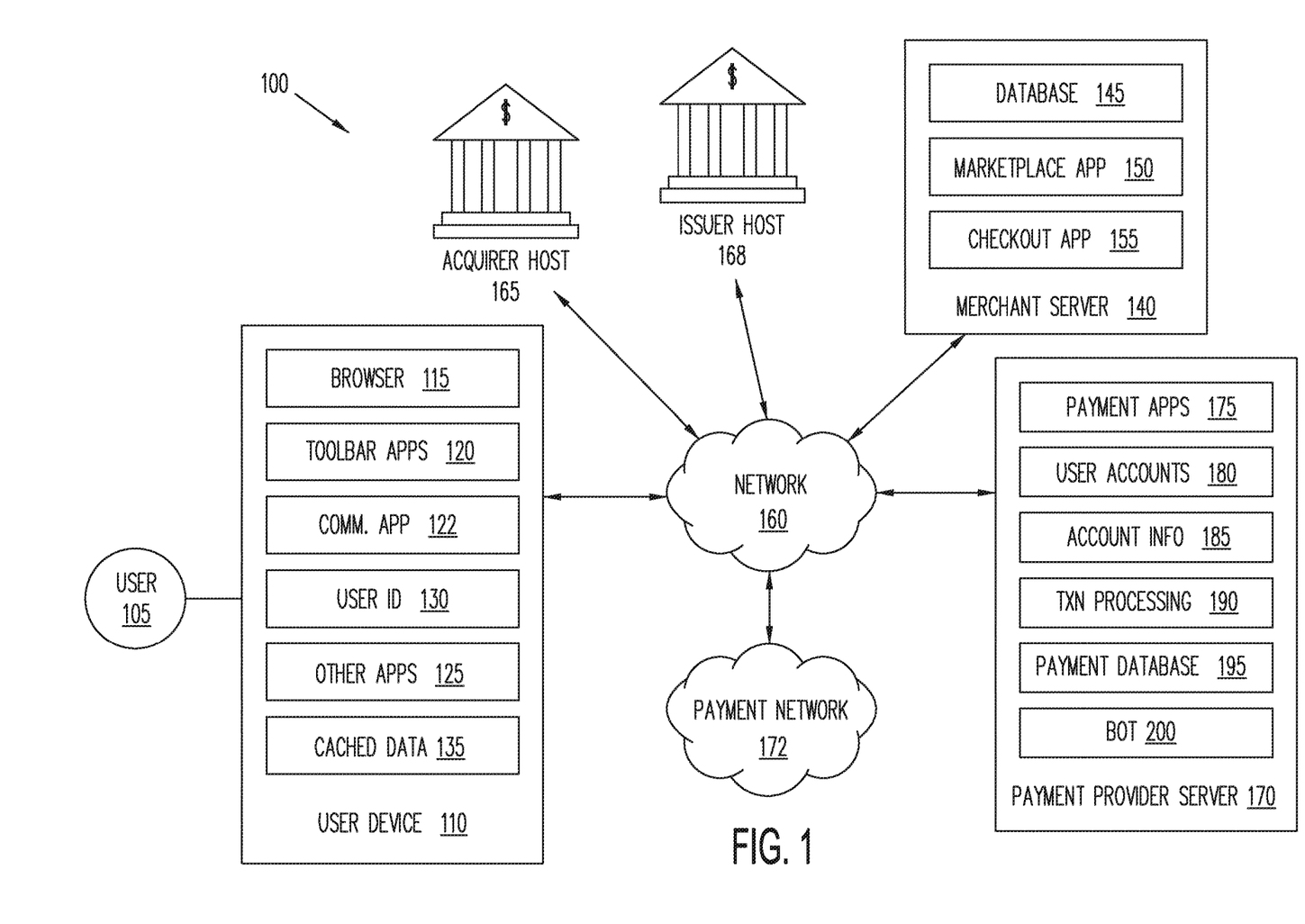
FIG. 1 is a block diagram of a networked system according to a various aspects of the present disclosure.

FIG. 1 is a block diagram of a networked system or architecture suitable for conducting electronic online transactions according to an embodiment. Networked system 100 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 100 may include a user device 110, a merchant server 140, a payment provider server 170, an acquirer host 165, an issuer host 168, and a payment network 172 that are in communication with one another over a network 160. Payment provider server 170 may be maintained by a payment service provider, such as PayPal, Inc. of San Jose, Calif. A user 105, such as a consumer, may utilize user device 110 to perform an electronic transaction using payment provider server 170. For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 110, merchant server 140, payment provider server 170, acquirer host 165, issuer host 168, and payment network 172 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 may be implemented using any appropriate hardware and software configured for wired and/or wireless communication over network 160. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 may include one or more browser applications 115 which may be used, for example, to provide a convenient interface to permit user 105 to browse information available over network 160. For example, in one embodiment, browser application 115 may be implemented as a web browser configured to view information available over the Internet, such as a user account for online shopping and/or merchant sites for viewing and purchasing goods and services. User device 110 may also include one or more toolbar applications 120 which may be used, for example, to provide client-side processing for performing desired tasks in response to operations selected by user 105. In one embodiment, toolbar application 120 may display a user interface in connection with browser application 115.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize a digital wallet through the payment provider as discussed herein.

User device 110 may include one or more user identifiers 130 which may be implemented, for example, as operating system registry entries, cookies associated with browser application 115, identifiers associated with hardware of user device 110, or other appropriate identifiers, such as used for payment/user/device authentication. In one embodiment, user identifier 130 may be used by a payment service provider to associate user 105 with a particular account maintained by the payment provider. A communications application 122, with associated interfaces, enables user device 110 to communicate within system 100.

User device 110 may install and execute a payment application received from the payment service provider to facilitate payment processes. The payment application may allow a user to send payment transaction requests to the payment service provider, which includes communication of data or information needed to complete the request, such as funding source information.

The user 105 may use the user device 110 to engage in activities such as browsing the web, chatting with other users online, conducting a search (e.g., for a product or a service) using a search engine or on a merchant's website, or posting messages on an electronic social media platform. Data pertaining to these activities may be saved as cached data 135 on the user device 110. The cached data 135 may be in the format of image files, text files, scripts (e.g., from websites), or other media files. The cached data 135 may store information such as website layout, recent searches, a user's contacts, or authentication credentials of the user. In some embodiments, the cached data 135 may be stored in a reserved or a specifically partitioned portion of an electronic memory of the user device 110. The cached data 135 makes subsequent access to the information underlying the cached data easier and/or faster. For example, when a website's layout is stored as a part of the cached data 135 during the user 105's initial visit to the website, the website can be loaded faster when the user 105 accesses the website again using the user device 110.

As another example, the user 105 may use the user device 110 to conduct searches for a product (e.g., a toy) on a website of an online merchant such as Amazon™, or via an electronic search engine such as Google™. The search term for the product may be stored as a part of the cached data 135 on the user device 110. When the user 105 uses the user device 110 to search for products again, the previous search term for the product (that was saved in the cached data 135) may automatically appear as a suggestion for a search term. Alternatively, or in addition to the search term being stored as or with the cached data 135, the search results from a previous search may be stored as cached data 135 in other embodiments. In other words, the user 105 may gain access to the search results in subsequent visits to the online merchant or to the search engine, without having to rerun the search.

As a further example, the user 105 may enter authentication credentials (e.g., a username and a password) via the user device 110 to access an account of the user for an entity, which may include a financial institution such as a bank, an online marketplace, a social media platform, or the like. The authentication credentials may be stored as a part of the cached data 135 on the user device 110. When the user 105 visits the entity subsequently, the user authentication credentials may populate the necessary fields automatically, and thus the user need not remember the authentication credentials. It is understood that the above are merely examples of the type of information that can be stored as cached data 135 and are not intended to be limiting, and that the cached data 135 may include other suitable information in various embodiments.

According to various aspects of the present disclosure, the cached data 135 may be used to determine an intended use context involving the user 105. For example, the intended use context may be that the user 105 would like to conduct a transaction or that the user 105 would like to send an electronic communication to one or more other users. If the intended use context is determined with a sufficiently high confidence level (e.g., meeting or exceeding a predefined threshold), one or more tasks may be automatically executed—for example by an intelligent bot—on behalf of the user 105. These aspects of the present disclosure will be discussed in greater detail below.

Still referring to FIG. 1, merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual. Merchant server 140 may include a database 145 identifying available products and/or services (e.g., collectively referred to as items) which may be made available for viewing and purchase by user 105. Accordingly, merchant server 140 also may include a marketplace application 150 which may be configured to serve information over network 360 to browser 115 of user device 110. In one embodiment, user 105 may interact with marketplace application 150 through browser applications over network 160 in order to view various products, food items, or services identified in database 145.

Merchant server 140 also may include a checkout application 155 which may be configured to facilitate the purchase by user 105 of goods or services online or at a physical POS or store front. Checkout application 155 may be configured to accept payment information from or on behalf of user 105 through payment provider server 170 over network 160. For example, checkout application 155 may receive and process a payment confirmation from payment provider server 170, as well as transmit transaction information to the payment provider and receive information from the payment provider (e.g., a transaction ID). Checkout application 155 may be configured to receive payment via a plurality of payment methods including cash, credit cards, debit cards, checks, money orders, or the like.

Payment provider server 170 may be maintained, for example, by an online payment service provider which may provide payment between user 105 and the operator of merchant server 140. In this regard, payment provider server 170 may include one or more payment applications 175 which may be configured to interact with user device 110 and/or merchant server 140 over network 160 to facilitate the purchase of goods or services, communicate/display information, and send payments by user 105 of user device 110.

Payment provider server 170 also maintains a plurality of user accounts 180, each of which may include account information 185 associated with consumers, merchants, and funding sources, such as credit card companies. For example, account information 185 may include private financial information of users of devices such as account numbers, passwords, device identifiers, usernames, phone numbers, credit card information, bank information, or other financial information which may be used to facilitate online transactions by user 105. Advantageously, payment application 175 may be configured to interact with merchant server 140 on behalf of user 105 during a transaction with checkout application 155 to track and manage purchases made by users and which and when funding sources are used.

A transaction processing application 190, which may be part of payment application 175 or separate, may be configured to receive information from a user device and/or merchant server 140 for processing and storage in a payment database 195. Transaction processing application 190 may include one or more applications to process information from user 105 for processing an order and payment using various selected funding instruments, as described herein. As such, transaction processing application 190 may store details of an order from individual users, including funding source used, credit options available, etc. Payment application 175 may be further configured to determine the existence of and to manage accounts for user 105, as well as create new accounts if necessary.

According to various aspects of the present disclosure, a bot 200 may also be implemented on the payment provider server 170. The bot 200 may include one or more software applications or software programs that can be automatically executed (e.g., without explicit instructions from a human user) to perform certain tasks. For example, the bot 200 may obtain the cached data 135 from the user device 110. The bot 200 may analyze the cached data 135 to determine a use context (e.g., the user 105 would like to purchase a product or the user 105 would like to send electronic communications to other users). If the determined use context meets or exceeds a predefined confidence level threshold, the bot 200 may self-execute certain tasks, such as placing orders on behalf of the user 105, or sending electronic communications to others on behalf of the user 105. The functionalities of the bot 200 will be discussed below in more detail with reference to FIGS. 2-6.

Although the cached data 135 is shown as being stored locally on the user device 110 in the embodiment of FIG. 1, it is understood that the cached data 135 may also be sent (e.g., periodically) over the network 160 to the payment provider server 170 or to the merchant server 140 to be electronically stored thereon. Further, although the bot 200 is illustrated as being separate from the transaction processing application 190 in the embodiment shown in FIG. 1, the transaction processing application 190 may implement some, or all, of the functionalities of the bot 200 in other embodiments. In other words, the bot 200 may be integrated within the transaction processing application 190 in some embodiments. In addition, it is understood that the bot 200 (or a bot similar to the bot 200) may be implemented on the user device 110, or on the merchant server 140 in some embodiments as well.

Still referring to FIG. 1, the payment network 172 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. A network of communication devices, servers, and the like also may be established to relay payment related information among the different parties of a payment transaction.

Acquirer host 165 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 168 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 2:
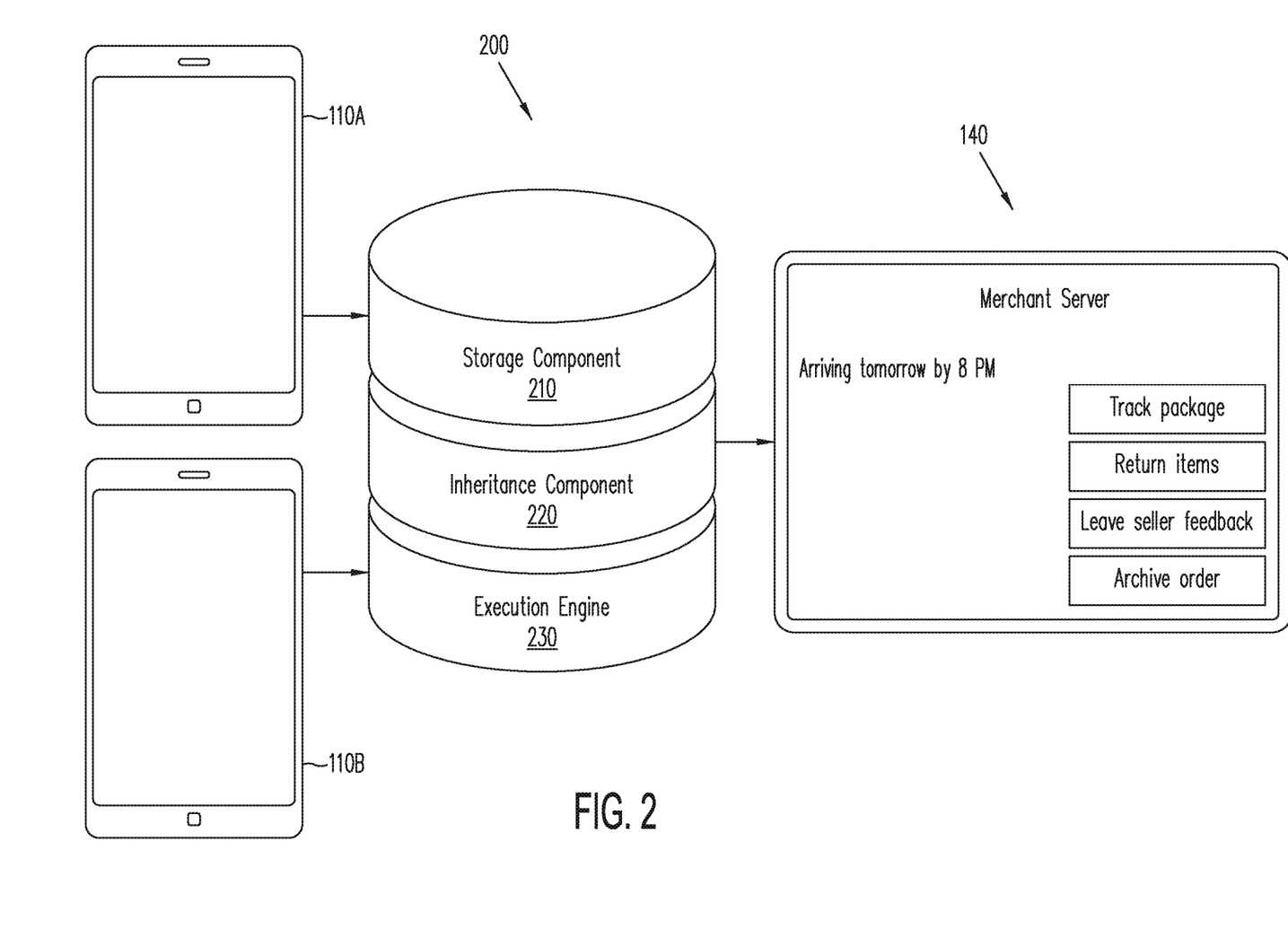
FIG. 2 is a block diagram of a system for using cached data to automatically execute tasks according to various aspects of the present disclosure.

FIG. 2 is a simplified block diagram illustrating an example scenario for automatically executing tasks on behalf of users based on cached data according to various aspects of the present disclosure. The cached data may be obtained from a user device 110A or a user device 110B. The user device 110A or 110B may each be an embodiment of the user device 110 of FIG. 1. In various embodiments, the user device 110A or 110B may be a smartphone (e.g., iPhone™), a tablet computer (e.g., iPad™), a laptop computer, a desktop computer, a smart home assistant (e.g., Amazon's Alexa™), or a wearable device such as a smart watch (e.g., Apple Watch™). The user devices 110A and 110B may be the same type of device, or they may be different types of devices (e.g., one of them is a smartphone, while the other one is a tablet computer). The user devices 110A and 110B may be two different devices of the same user (e.g., the user 105 in FIG. 1), or they may belong to different users.

As the user of the user device 110A or 110B uses it to engage in activities such as browsing the web, chatting online, conducting searches, or posting on social media platforms, etc., data such as the cached data 135 of FIG. 1 is saved. The cached data may be stored locally on the user device 110A or 110B. In the embodiment shown in FIG. 2, the cached data is also sent to the bot 200. As discussed above in association with FIG. 1, the bot 200 may be implemented on the payment provider server 170. As such, the bot 200 may receive the cached data from the user device 110A or 110B over the network 160. For example, the bot 200 may periodically query the user device 110A or 110B to obtain the most recent updates for the cached data. The bot 200 may store the cached data in a storage component 210, which may include a portion of an electronic memory (e.g., RAM, hard disk, FLASH memory, or other types of solid state memory) on the payment provider server 170.

Of course, as discussed above in association with FIG. 1, the bot 200 may be alternatively implemented on the merchant server 140 or on the user devices 100A or 100B themselves. In embodiments where the bot 200 is implemented on the merchant server 140, the bot 200 may also obtain the cached data from the user devices 110A or 110B via the network 160 and store it in the storage component 210. In embodiments where the bot 200 is implemented on the user devices 110A or 110B, the storage component 210 may be a portion of the local electronic memory of the user device 110A or 110B.

Regardless of where the bot 200 is implemented, the storage component 210 may store the cached data in a compartmentalized manner. As an example, cached data rendered from the user device 110A and the cached data rendered from the user device 110B are compartmentalized. In other words, the storage component 210 may have separate storage locations for storing the cached data from the user devices 110A and 110B, or at least a mechanism (e.g., different identifiers) for identifying the different cached data that originated from the user devices 110A and 110B.

Compartmentalizing the cached data is beneficial, since each type of device may have its own cache context. For example, a tablet computer may be caching data for multimedia viewing or website browsing, a smartphone may be caching data for social media postings or electronic messaging, a smart home assistant may be caching data for product searches, and a wearable device may be caching data for the user's physiological characteristics. In some embodiments, the cached data may also be compartmentalized based on geo-location. For example, a user may use his user device differently at work and at home, which may have different geo-locations. In embodiments where the user devices 110A and 110B belong to separate users, compartmentalizing the cached data becomes even more advantageous, as each user may have their own behavior characteristic that may be reflected by the cached data.

The cached data associated with different compartments may be utilized in conjunction with one another to determine a use context. For example, the cached data from a tablet computer or a desktop/laptop computer of the user may include a web browsing history for a user, where a product (e.g., a particular type of toy) appears repeatedly in the web browsing history, indicating that the user has been viewing many web pages or search engine queries related to the product. Meanwhile, the cached data from a smartphone of the user may include one or more conversations that the user had with other users. For example, the user may have mentioned the product a few times in an instant messaging application with another user, or an electronic text exchange with another user, or a post on the user's account with a social media platform. In addition, the user may have asked a smart home assistant for reviews and/or pricing for the product. Each of the different types of cached data may indicate that the user may be interested in the product, for example that the user would like to purchase the product.

In some embodiments, a confidence level (e.g., regarding the user wanting to purchase the product) may be determined based on each of the compartmentalized cached data. For example, based on the cached data from the tablet/desktop/laptop computer, a confidence level of 50% may be established. Based on the cached data from the smartphone, a confidence level of 60% may be established. Based on the cached data from the smart home assistant, a confidence level of 65% may be established. The bot 200 may include an algorithm to calculate an overall confidence level based on the various confidence levels determined from individual compartmentalized cached data. In some embodiments, the algorithm may select the highest confidence level as the overall confidence level. In other embodiments, the algorithm may select the lower confidence level as the overall confidence level. In yet further embodiments, the algorithm may calculate the overall confidence level as a function of the various confidence levels determined from individual compartmentalized cached data, where the overall confidence level may be between the highest confidence level and the lowest confidence level, or even exceeding the highest confidence level.

It is understood that certain user devices or certain user behaviors may weigh more heavily than others in determining the confidence level. For example, if the user's primary device is a smartphone—which may be demonstrated by the fact that the amount of time the user interacts with the smartphone is significantly more than the rest of the user devices—then the cached data from the smartphone may be weighed more heavily in calculating the confidence level. As another example, the cached data from a more recent time period may be weighed more heavily than the cached data from a longer time ago. As yet another example, if the cached data indicates that the user has done repeated searches for a single product, that may be weighed more heavily than if the user had done repeated searches for multiple products, even if the number of searches per product is the same as for the single product. This is because repeated searches for a single product (e.g., ten searches within the last hour) indicates that the user has "zeroed in" on a particular product and that a decision to buy that product is imminent, whereas repeated searches for multiple products (e.g., thirty searches for three products within the last hour, ten searches per product) may indicate that the user is still performing comparison shopping and is not ready to commit to buying any particular product yet. In the last example, instead of or in addition to assigning different weightings to the cached data, the confidence level may also be lowered if the user is searching for multiple products rather than a single product.

Regardless of how the overall confidence level is calculated, the bot 200 will automatically execute a task with the execution engine 230 when the overall confidence level meets or exceeds a predefined threshold. In the above example, if the calculated overall confidence level (that the user wants to purchase the product) is 75%, and that the predetermined threshold is 60%, then the execution engine will automatically place a purchasing order for the product on behalf of the user. The various other types of functionalities of the execution engine 230 will be discussed in more detail below.

The bot 200 further includes an inheritance component 220. The inheritance component 220 can expand the cached data based on data "inherited" from affinity users. Affinity users may refer to users who are friends and/or family of a user. In some embodiments, a user may designate other users as affinity users. For example, a user may select users from a contact list or an electronic phonebook and designate the selected users as affinity users. In other embodiments, the bot 200 may automatically determine, without manual input from the user, which other users should be considered affinity users. For example, the inheritance component 220 of the bot 200 may monitor the online chats, electronic messages, phone calls, or social media posts of a first user. Based on factors such as a frequency of interaction (e.g., phone calls or texts daily or multiple times a week) between a first user and a second user, or how the first user addresses the second user (e.g., the first user addressing the second user as "mom" or "dad"), or the physical proximity between the user devices of the first user and the second user (e.g., detectable via short range communication technologies such as Bluetooth or NFC), the inheritance component 220 of the bot 200 may determine that the second user is an affinity user of the first user.

The inheritance component 220 is configured to "inherit" the cached data from the affinity users. The cached data from the affinity users may be used to refine the confidence level discussed above. In the example where the confidence level pertains to whether the user would like to purchase a product, if the cached data from the affinity users indicate that the affinity users have also been browsing, searching, or viewing information related to the product, then that would raise the confidence level that the user indeed would like to purchase the product. Conversely, if the cached data from the affinity users are completely devoid of any mention of the product or type of product, then that may lower the confidence level.

The bot 200 also includes an execution engine 230. The execution engine 230 can automatically execute a task or an event on behalf of the user without manual involvement of the user. As non-limiting examples, the automatically executed task may include: conducting a transaction, placing an order, sending a friend request on a social medial platform, posting an electronic message. In some embodiments, the execution engine 230 is the component of the bot 200 that analyzes the cached data to determine the confidence level for an intended use context for the user. In response to the determined confidence level meeting or exceeding a predefined threshold, the execution engine 230 automatically executes a task that is appropriate for the intended use context.

For example, the cached data (which may be compartmentalized and come from different user devices) in the storage component 210 for a user may reveal that the user has been browsing reviews of a product, conducting searches for merchants that sell the product, chatting with a friend (e.g., an affinity user) about the product, querying a smart home assistant about pricing and/or availability of the product, and/or posting information about the product on the user's account with an electronic social media platform. The cached data may further include cached data of one or more affinity users that is obtained by the inheritance component 220. For example, the cached data from the affinity users may also reveal that a parent, a child, a sibling, or a friend of the user has also been conducting searches, reading reviews, or chatting with others (including with the user) about the product. Based on the information obtained from the cached data, the execution engine 230 may determine a confidence level for an intended use context for the user.

As a non-limiting example, the intended use context may be a purchase of the product. As discussed above, the confidence level may include a plurality of different confidence levels each associated with the cached data obtained from a different device, or a different user, or even a different geographical location. The overall confidence level may be calculated as a function of the different confidence levels. If the overall confidence level for the intended use context (e.g., purchasing the product in this example) meets or exceeds a predefined threshold, the execution engine 230 may automatically place an order for the product on behalf of the user. For example, the execution engine 230 may electronically communicate with the merchant server 140 that hosts a merchant website through which the product can be ordered.

As incentives for the user, the automatically placed order may enjoy certain benefits that are not generally available for other orders placed manually by the user. For example, the automatically placed order may enjoy benefits such as an extended cancellation time frame (e.g., one month versus one week), a reduced shipping fee (e.g., free or a 50% discount), or a delayed debiting (e.g., debiting occurs X number of days after delivery of the product versus instant debiting) of an account of the first user.

As another non-limiting example, the intended use context may be sending an electronic communication to another user. For example, the first user sends a text to a second user, saying that the first user would like to add the second user to as a "friend" or a "contact" on an electronic social network, but that the first user could not find the profile of the second user. The execution engine 230 may intercept this text and may examine the cached data to see if any of the second user's identifying characteristics (e.g., email address, physical address, phone number, chat handle, title at a company, etc.) may help locate a profile of the second user on the electronic social network. In some embodiments, the execution engine 230 may also leverage the cached data for affinity users of the first user. For example, after examining the first user's cached data, the execution engine 230 still cannot find the profile of the second user. The execution engine 230 may then examine the cached data of one or more affinity users of the first user to see if the profile of the second user can be found. In any case, once the correct profile belonging to the second user is found, and also if the execution engine 230 determines that the confidence level of the first user wanting to add the second user in the social network meets or exceeds a predefined level, the execution engine 230 may automatically send an electronic communication (e.g., a "friend" request) to the second user via the electronic social network.

The electronic communication need not be limited to a friend request sent to another user via an electronic social network either. In various embodiments, the electronic communication may include status updates, tweets (e.g., via Twitter™), or chat replies automatically sent on behalf of the user. For example, the cached data may indicate that the user has composed a status update, a tweet, or a chat message in an online chat, but that the user has not sent it out yet. The execution engine 230 may determine the confidence level regarding the intend use context based on the cached data, for example that the user meant to send out the electronic communication but either forgot to do so, or was unable to because the user device experienced a temporary failure (e.g., app crashed, or loss of network connectivity). The execution engine 230 may also monitor one or more statuses of the user device on which the unsent electronic communication is composed. For example, the execution engine 230 may monitor a battery status of the user device or a cellular or Wi-Fi network connectivity of the user device. If the confidence level of sending out the electronic communication on behalf of the user meets or exceeds the predefined threshold, the execution engine 230 may automatically execute such a task in response to the one or more statuses of the user device meeting a specified condition. For example, if the battery status of the user device is below a predefined threshold (e.g., less than 1%), that may trigger the execution engine 230 to automatically send out the electronic communication on behalf of the user, before the user device is shut off due to the battery being dead. As another example, if the user device previously had no network connectivity but has now gained network connectivity, that may trigger the execution engine to automatically send out the electronic communication on behalf of the user as well.

As another non-limiting example, the intended use context may be making a payment (or otherwise conducting a transaction) on behalf of the user. For example, the cached data may indicate that the user receives a phone bill every month, and shortly after the receipt of the phone bill, the user goes on the phone carrier's website to make a payment. The execution engine 230 may determine a confidence level regarding the user wanting to always pay this phone bill. If the determined confidence level meets or exceeds a threshold level, the execution engine 230 may automatically log on to the carrier's website (again using the user's authentication credentials saved in the cached data) and pay a subsequent phone bill on the user's behalf.

In some embodiments, the execution engine 230 may include a risk analysis component. The risk analysis component may perform a dummy transaction on the user's behalf (e.g., making a dummy payment) to evaluate the likelihood of a problem occurring if a real transaction is made. Based on the results of the dummy transaction, the execution engine 230 may either go through with making the real transaction, or postpone it until further input (e.g., additional cached data) is received and/or the problems that occurred in the dummy transaction have been resolved. In some embodiments, the execution engine 230 may also execute a dummy transaction if the calculated overall confidence level does not meet a first threshold but meets a second (and lower threshold). The dummy transaction approximates or simulates the real transaction and/or its ramifications or effects. Based on the result of the dummy transaction, the execution engine 230 may determine whether to execute the real transaction.

The above discussions mostly pertain to one user, but it is understood that they may apply to multiple users. In the case of multiple users, bot 200 may also prioritize certain users over other users. For example, the cached data from a first user's device and a second user's device may reveal that a first user and a second user have each been conducting repeated searches for a product, and the execution engine 230 has determined, with a sufficiently high confidence level, that both the first user and the second user intends to purchase the product. However, there may be only one product level in the inventory of a merchant. The execution engine 230 may then prioritize placing an automatic order of the product on behalf of one of the first and second users over the other. The prioritizing may be based on factors such as: a difference in the determined confidence levels of placing the order for the product for the first and second users, a preferred member status of the first/second user with the merchant, a length of time that the first/second user has used the bot 200, type of payment instrument used by the first/second user to pay for the product, a geographical locations of the first/second user, etc. In some embodiments, the execution engine 230 may "remember" the de-prioritized user and will automatically place an order for the de-prioritized user when the product becomes available later.

The various aspects of the present disclosure may also apply to other types of databases or storage mechanisms, including a blockchain. A blockchain may refer to a list of records (which may also be referred to as blocks) that are linked together, over which cryptography is applied to ensure the integrity and the security of the entire chain. The records/blocks in a blockchain may each contain a cryptographic hash of its previous record/block, a timestamp, as well as transaction data. Unlike conventional systems where a centralized server may manage an entire list of records, the records in a blockchain is managed by a decentralized peer-to-peer network. The participants in a blockchain system all adhere to a set of protocols for communication and for validating new records/blocks. Once the transaction data in a record/block is recorded, such data cannot be modified retroactively without the alteration of all subsequent blocks. Hence, blockchain systems are more secure and resistant to hacking or tampering than conventional record keeping systems. Due to these advantages, blockchain technology has been implemented in data management, record keeping, crypto-currency, voting rights, accounting, smart contracts (e.g., contracts that can be executed and/or enforced without human interaction), etc.

Figure 3:
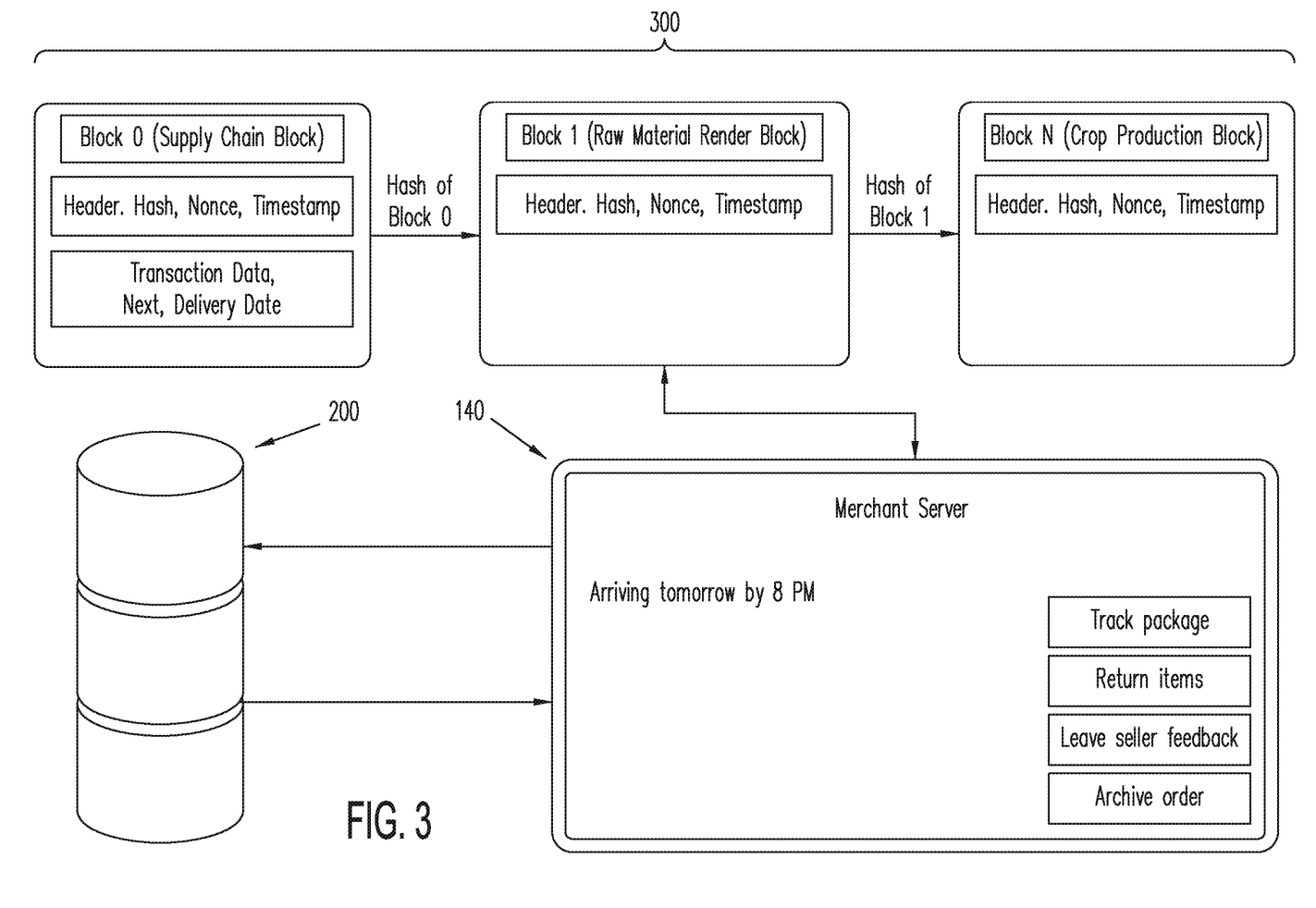
FIG. 3 illustrates a blockchain system and how it is used to facilitate the automatic execution of tasks according to various aspects of the present disclosure.

Referring now to FIG. 3, an example use scenario involving the bot 200 and a blockchain system 300 is illustrated according to various aspects of the present disclosure. The blockchain system 300 is a simplified segment of what may be a much larger chain, and it includes a block 0, a block 1, and a block N. The block 0 is a supply chain block, the block 1 is a raw materials render block, and the block N is a crop production block. Each of the blocks in the blockchain system 300 includes a respective header.hash, nonce, and a timestamp. The header.hash may serve as an identifier for the block. The header.hash for each block is also calculated as a function of the previous block's hash. For example, as shown in FIG. 3, block 0 sends the hash of block 0 to block 1, so that block 1 calculates its header.hash as a function of the hash of block 0. Block 1 sends the hash of block 1 to block N, so that block N calculates its header.hash as a function of the hash of block 1. The nonce may be a random or pseudo-random and arbitrary number used only once in a cryptographic communication. The nonce adds more variance to the block and makes it more difficult to generate a valid hash for a given block. The timestamp keeps track of the creation and modification of the transactions of the block. Each block may have its own appropriate contents, for example transaction data or next delivery date in block 0 (the contents of blocks 1 and N are not specifically illustrated herein for reasons of simplicity).

According to the present disclosure, the bot 200 may evaluate the cached data (e.g., stored and/or obtained by the storage component 210) to determine a particular context. For example, based on the user's past searches, reviews, web browsing history, electronic messages, or interaction with affinity users, the bot 200 (e.g., the execution engine 230) may determine, with a sufficiently high confidence level (e.g., above 80%) that an intended use context is to order a product from a merchant on behalf of a user. The making of the product may involve the blockchain system 300.

The bot 200 shares the determined intended use context with a merchant, for example by electronically communicating the intended use context to the merchant server 140. The merchant server 140 may prepare a provisional order for the product on behalf of the user but will wait for a trigger from the bot 200 before the order is executed. Meanwhile, the merchant server 140 gets feed from the participants of the blockchain system 300 for the information pertaining to the product (e.g., supplier, raw material provider, and crop production owner). For example, the feed may inform the merchant server 140 that the next delivery date for the product may be one month from today. The merchant server 140 may relay the information obtained from the blockchain system 300 back to the bot 200.

The bot 200 also monitors the available inventory of the product at the merchant by periodic communication with the merchant server 140. In some embodiments, when the available inventory is sufficiently low (e.g., at a quantity of one), and that the information obtained from the blockchain system 300 indicates that the next delivery date for the product to the merchant is far out (e.g., more than a month later), these conditions may serve as a trigger for the bot 200 to automatically place an order for the product on behalf of the user at the merchant. The rationale may be that the low inventory suggests that the product may be sold out soon, and that the long delivery date suggests that once the product is sold out, it may take a long period of time before the product can be ordered again. Therefore, it behooves the user to go ahead and order the product now.

In embodiments where a payment service provider is also linked to the bot 200, the payment service provider may run risk analysis on the automatically placed order by the bot 200 to ensure that no problematic issues will arise if the order is placed. The payment provider may then allow the transaction to proceed.

The merchant server 140 may provide extra benefits for the order automatically placed by the bot 200. For example, the extra benefits may include free return pickup, reducing shipping costs, longer transaction settlement/debiting period, extended guaranteed cancellation period, etc.

It is understood that although the bot 200 is separately illustrated from the merchant server 140 in the embodiment shown in FIG. 3, the bot 200 may be integrated as a service or a program or application running on the merchant server 140 in other embodiments.

Figure 4:
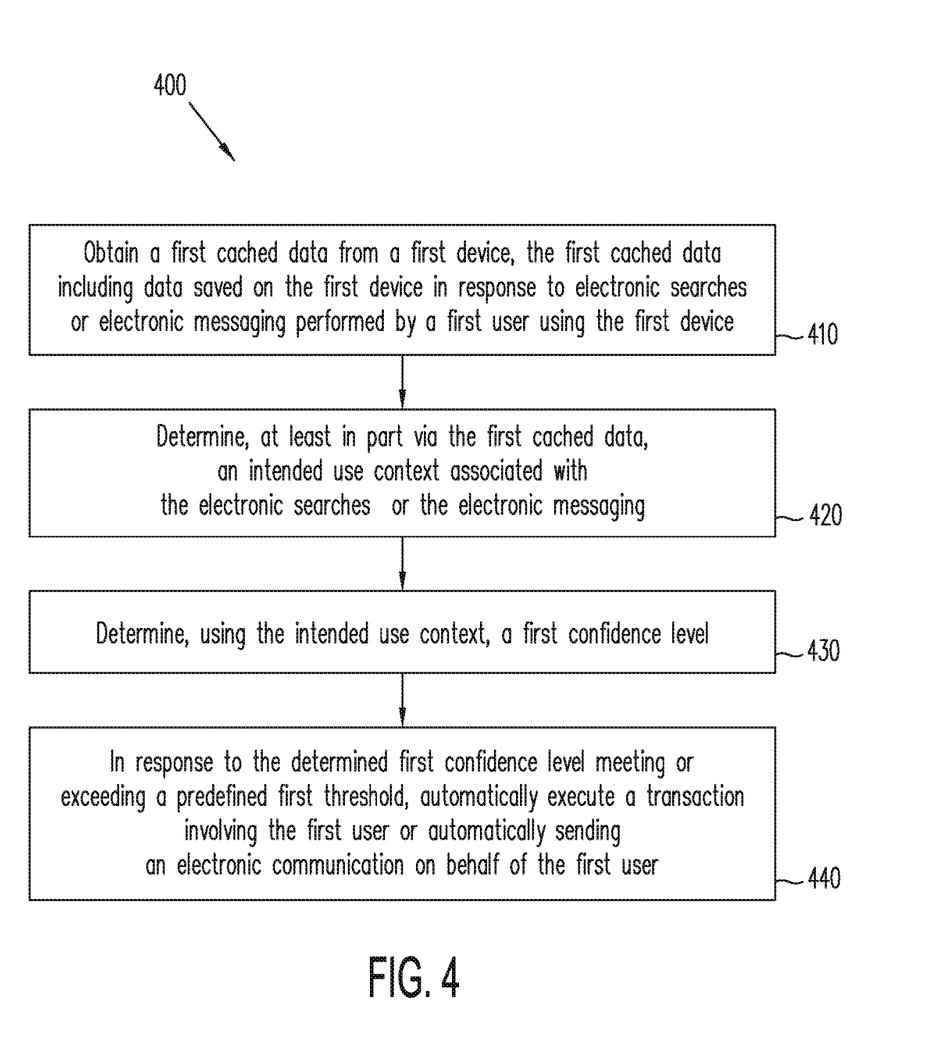
FIG. 4 is a flowchart illustrating a method of using cached data to automatically perform tasks according to various aspects of the present disclosure.

FIG. 4 is a flowchart illustrating a method 400 for automatically executing tasks based on cached data according to various aspects of the present disclosure. The method 400 includes a step 410 to obtain a first cached data from a first device. The first cached data includes data saved on the first device in response to electronic searches or electronic messaging performed by a first user using the first device.

The method 400 includes a step 420 to determine, at least in part via the first cached data, an intended use context associated with the electronic searches or the electronic messaging.

The method 400 includes a step 430 to determine, using the intended use context, a first confidence level.

The method 400 includes a step 440 to automatically execute a transaction involving the first user or automatically sending an electronic communication on behalf of the first user. The step 420 is performed in response to the determined first confidence level meeting or exceeding a predefined first threshold.

In some embodiments, the first cached data includes data associated with a first geographical location.

In some embodiments, the first cached data comprises a plurality of user searches from the first user for a first product on a website of a merchant. In some embodiments, the transaction comprises an automatically executed contract involving the first product on behalf of the first user.

In some embodiments, one or more additional benefits are provided to the first user in association with the automatically executed transaction. For example, the one or more additional benefits may include: an extended cancellation time frame, a reduced shipping fee, or a delayed debiting of an account of the first user for the automatically executed transaction.

In some embodiments, the first cached data comprises an electronic messaging conversation involving the first user, and a battery condition of the first device is detected to be below a predefined battery threshold, and the automatically sending the electronic communication comprises sending, on behalf of the first user and in response to the detecting, an electronic message to one or more second users participating in the electronic messaging conversation.

In some embodiments, the first cached data comprises an electronic messaging conversation involving the first user and a second user, and the automatically sending the electronic communication comprises sending, on behalf of the first user, a request to the second user to add the first user to an electronic social network of the first user.

In some embodiments, the first cached data further comprises data retrieved from devices of second users whose affinity with the first user exceeds a predefined affinity threshold.

In some embodiments, the automatically executing the transaction comprises: obtaining, from a blockchain system, information pertaining to a future delivery date of a product; monitoring an inventory level of the product at a merchant; detecting, based on the obtained information from the blockchain system and the monitored inventory level, that the next delivery date of the product exceeds a predefined length of time and that the inventory level of the product is at or below a predefined inventory level; and performing the automatically executing the transaction in response to the detecting.

It is understood that additional method steps may be performed before, during, or after the steps 410-440 discussed above. For example, the method 400 may include a step to obtain a second cached data from a second device different from the first device, where the second cached data includes data saved on the second device in response to electronic searches or electronic messaging performed by the first user using the second device. In some embodiments, the determining of the intended use context includes detecting an interaction of the first user with the first device or with the second device. As another example, the method 400 may include steps of: in response to the determined first confidence level not meeting the first threshold but meeting or exceeding a second threshold lower than the first threshold, automatically execute a dummy transaction that approximates the transaction; and analyzing one or more risks of executing the transaction based on the executed dummy transaction. For reasons of simplicity, other additional steps are not discussed in detail herein.

Based on the above discussions, it can be seen that the present disclosure offers several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, by implementing the bot 200 as discussed above, the computers on which the bot 200 are implemented effectively become intelligent machines capable of making context-appropriate decisions on behalf of the users. In other words, the computers with the bot 200 implemented thereon have much more versatile functionalities compared to conventional computers. The bot 200 further improves the functionality of a computer by improving the speed at which transactions can be conducted, since the bot 200 does not rely on manual human user's input (which may be slow) to complete the transactions. Another advantage is that the present disclosure offers convenience for the user by determining, with a high confidence level, intended use contexts and thereafter automatically executing tasks that suit the context. Yet another advantage is that the users may enjoy additional benefits associated with the automatically executed tasks, such as extended cancellation period, delayed debiting, free or cost-reduced shipping, etc.

Figure 5:
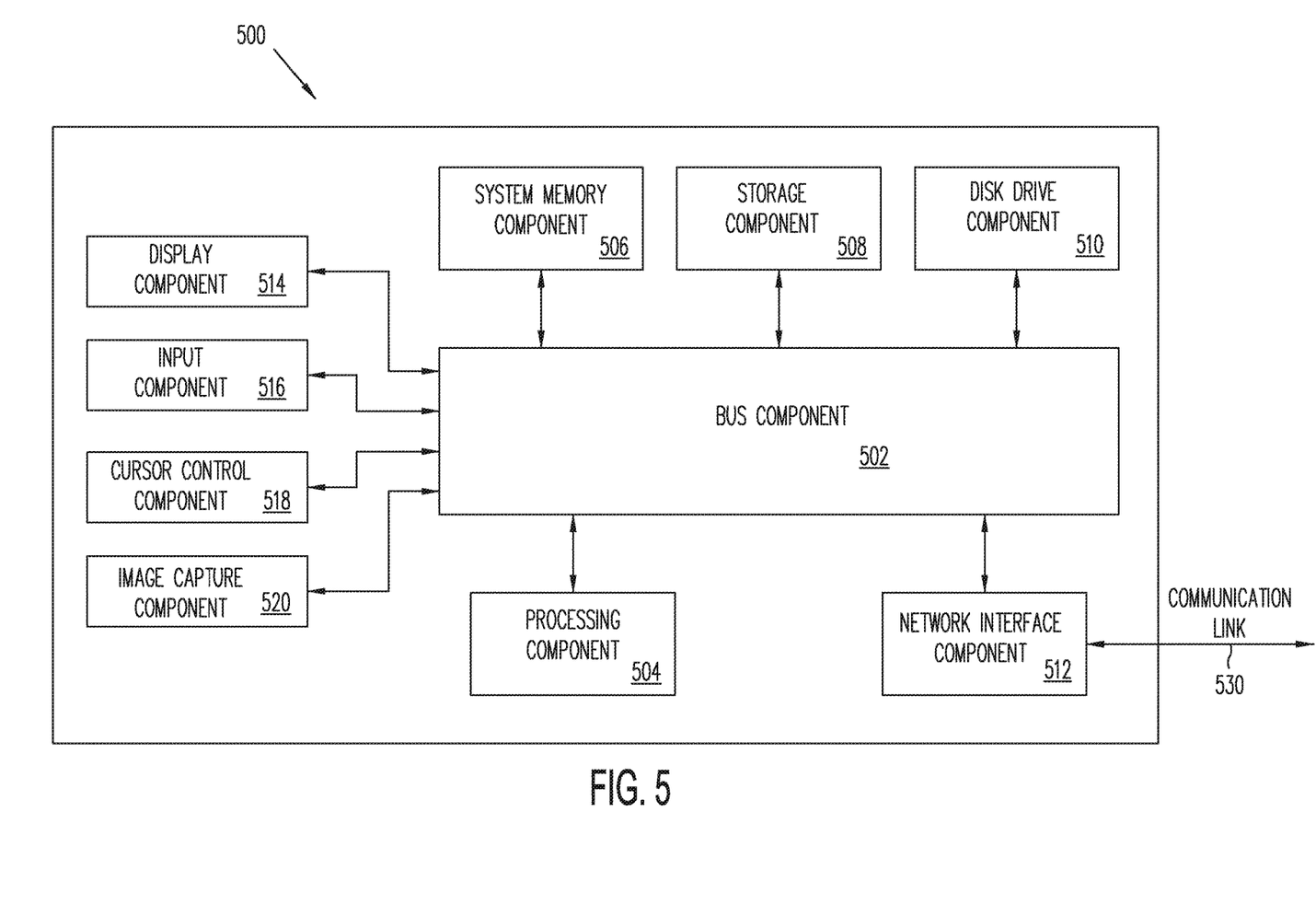
FIG. 5 is an example computer system according to various aspects of the present disclosure.

FIG. 5 is a block diagram of a computer system 500 suitable for implementing various methods and devices described herein, for example, the bot 200 and the various method steps of the method 400, or the user device 110, the merchant server 140, or the payment provider server 170. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the bot 200 and the various method steps of the method 400 (or the user device 110, the merchant server 140, or the payment provider server 170) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components. In some embodiments, the cached data 135 of FIG. 1 may be stored in the system memory component 506 or the disk drive component 510. In some embodiments, the storage component 210 of the bot 200 may also be implemented at least partially within the system memory component 506 or the disk drive component 510.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the bot 200 (e.g., the execution engine 230) may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the cached data 135 or to implement the storage component 210 discussed above.

In various embodiments of the present disclosure, execution of instruction sequences to practice the present disclosure may be performed by computer system 500. In various other embodiments of the present disclosure, a plurality of computer systems 500 coupled by communication link 530

(e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the bot 200 and external devices, for example with the user device 110, with the merchant server 140, or with the payment provider server 170, depending on exactly where the bot 200 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the bot 200 may be implemented as such software code.

Figure 6:
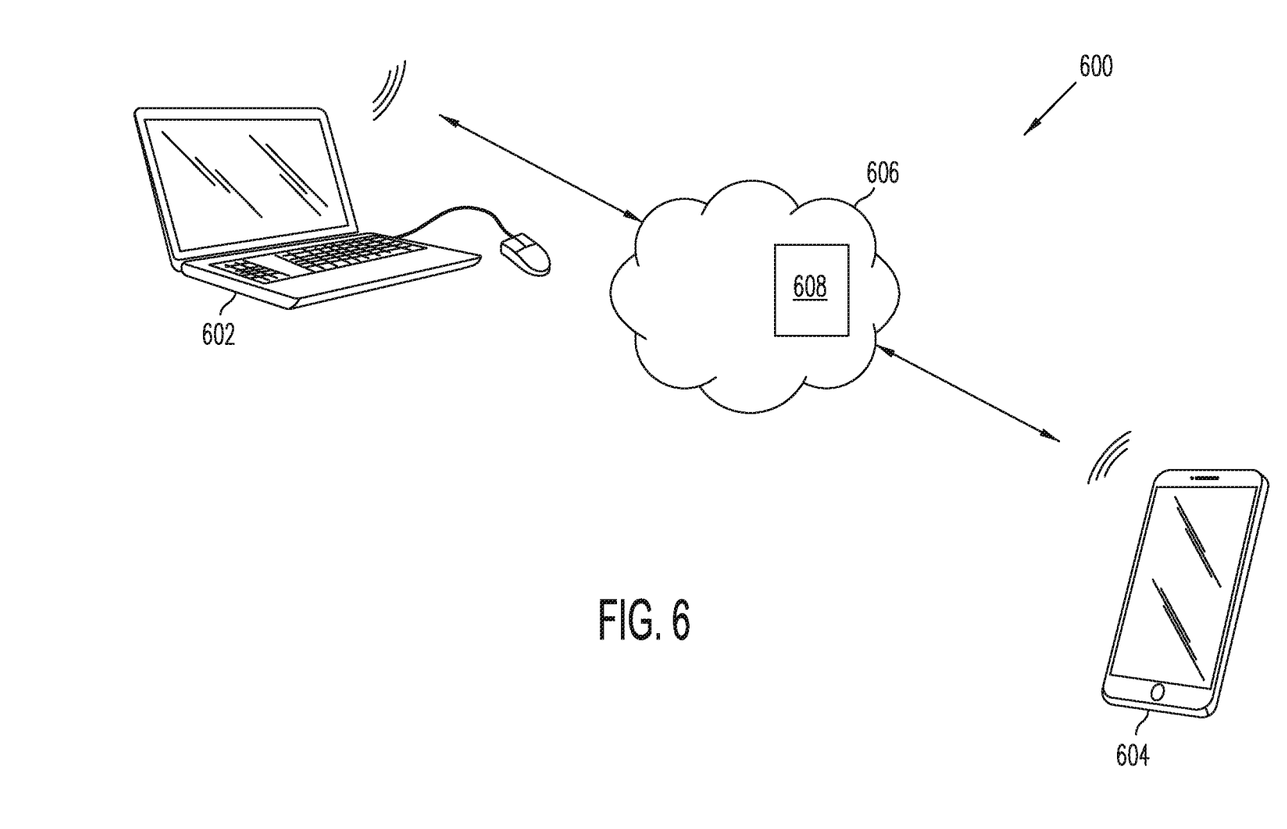
FIG. 6 is a simplified example of a cloud-based computing architecture according to various aspects of the present disclosure.

FIG. 6 illustrates an example cloud-based computing architecture 600, which may also be used to implement various aspects of the present disclosure. The cloud-based computing architecture 600 includes a mobile device 604 (e.g., the user device 110 of FIG. 1) and a computer 602 (e.g., the merchant server 140 or the payment provider server 170), both connected to a computer network 606 (e.g., the Internet or an intranet). In one example, a consumer has the mobile device 604 that is in communication with cloud-based resources 608, which may include one or more computers, such as server computers, with adequate memory resources to handle requests from a variety of users. A given embodiment may divide up the functionality between the mobile device 604 and the cloud-based resources 608 in any appropriate manner. For example, an app on mobile device 604 may perform basic input/output interactions with the user, but a majority of the processing and caching may be performed by the cloud-based resources 608. However, other divisions of responsibility are also possible in various embodiments. In some embodiments, using this cloud architecture, the bot 200 may reside on the user device 110, but its functionalities can be accessed or utilized by the merchant server 140 or by the payment provider server 170. Similarly, the bot 200 may reside on the merchant server 140 or on the payment provider server 170, but its functionalities may be accessed or utilized by the user device 110. The same may be true for the cached data 135. That is, regardless of where the cached data 135 is originally stored, it may be accessed remotely by other devices via the cloud-based architecture.

The cloud-based computing architecture 600 also includes the personal computer 602 in communication with the cloud-based resources 608. In one example, a participating merchant or consumer/user may access information from the cloud-based resources 608 by logging on to a merchant account or a user account at computer 602. The system and method for automatically executing tasks based on cached data discussed above may be implemented at least in part based on the cloud-based computing architecture 600.

It is understood that the various components of cloud-based computing architecture 600 are shown as examples only. For instance, a given user may access the cloud-based resources 608 by a number of devices, not all of the devices being mobile devices. Similarly, a merchant or another user may access the cloud-based resources 608 from any number of suitable mobile or non-mobile devices. Furthermore, the cloud-based resources 608 may accommodate many merchants and users in various embodiments.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a system that includes a non-transitory memory and one or more hardware processors coupled to the non-transitory memory and configured to read instructions from the non-transitory memory to cause the system to perform operations comprising: obtaining a first cached data from a first device, the first cached data including data saved on the first device in response to electronic searches or electronic messaging performed by a first user using the first device; determining, at least in part via the first cached data, an intended use context associated with the electronic searches or the electronic messaging; determining, using the intended use context, a first confidence level; and in response to the determined first confidence level meeting or exceeding a predefined first threshold, automatically executing a transaction involving the first user or automatically sending an electronic communication on behalf of the first user.

Another aspect of the present disclosure involves a method that includes the following steps: obtaining a first cached data from a first device, the first cached data including: a plurality of user searches from a first user for a first product on a website of a merchant or an electronic conversation involving the first user; determining, at least in part via the first cached data, an intended use context associated with the user searches or the electronic conversation; determining, based on the intended use context, a first confidence level for automatically executing a task; and in response to the determined first confidence level meeting or exceeding a predefined first threshold, automatically executing a transaction involving the first product on behalf of the first user or automatically sending an electronic communication on behalf of the first user.

Yet another aspect of the present disclosure involves a non-transitory machine-readable medium having stored thereon machine-readable instructions executable to cause a machine to perform operations comprising: obtaining cached data from one or more devices of a first user, the cached data including: one or more searches for a product or an electronic message involving the first user; determining, at least in part via the cached data, an intended use context associated with the one or more searches or the electronic message; calculating, based on the intended use context, a confidence level for automatically executing a task on behalf of the first user; and in response to the calculated confidence level meeting or exceeding a predefined threshold, automatically executing one or more of the following tasks on behalf of the first user without manual involvement from the first user: automatically placing an order for the product on a website of merchant; sending a chat reply; sending a tweet; sending a social media friend request to a second user; or paying a bill.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
    a non-transitory memory; and
    one or more hardware processors coupled to the non-transitory memory and configured to read instructions from the non-transitory memory to cause the system to perform operations comprising:
        obtaining a first cached data from a first device, the first cached data including data saved on the first device in response to electronic searches or electronic messaging performed by a first user using the first device;
        determining, at least in part via the first cached data, an intended use context associated with the electronic searches or the electronic messaging;
        determining, based on the intended use context, a first confidence level; and
        in response to the determined first confidence level meeting or exceeding a predefined first threshold, automatically executing a transaction involving the first user.

2. The system of claim 1, wherein the first cached data includes data associated with a first geographical location.

3. The system of claim 1, wherein:
    the first cached data comprises a plurality of user searches from the first user for a first product on a website of a merchant; and
    the transaction comprises an automatically executed contract involving the first product on behalf of the first user.

4. The system of claim 3, wherein the operations further comprise:
    providing one or more additional benefits to the first user in association with the automatically executed transaction, wherein the one or more additional benefits comprise: an extended cancellation time frame, a reduced shipping fee, or a delayed debiting of an account of the first user for the automatically executed transaction.

5. The system of claim 3, wherein the operations further comprise:
    in response to the determined first confidence level not meeting the first threshold but meeting or exceeding a second threshold lower than the first threshold, automatically executing a dummy transaction that approximates the transaction; and
    analyzing one or more risks of executing the transaction based on the executed dummy transaction.

6. The system of claim 1, wherein:
    the first cached data comprises an electronic messaging conversation involving the first user;
    the operations further comprise detecting that a battery condition of the first device is below a predefined battery threshold; and
    wherein the operations further comprise sending, on behalf of the first user and in response to the detecting, an electronic message to one or more second users participating in the electronic messaging conversation.

7. The system of claim 1, wherein:
    the first cached data comprises an electronic messaging conversation involving the first user and a second user; and
    wherein the operations further comprise sending, on behalf of the first user, a request to the second user to add the first user to an electronic social network of the first user.

8. The system of claim 1, wherein the first cached data further comprises data retrieved from devices of second users whose affinity with the first user exceeds a predefined affinity threshold.

9. The system of claim 1, wherein the automatically executing the transaction comprises:
    obtaining, from a blockchain system, information pertaining to a future delivery date of a product;
    monitoring an inventory level of the product at a merchant;
    detecting, based on the obtained information from the blockchain system and the monitored inventory level, that the next delivery date of the product exceeds a predefined length of time and that the inventory level of the product is at or below a predefined inventory level; and
    performing the automatically executing the transaction in response to the detecting.

10. The system of claim 1, wherein the operations further comprise:
    obtaining a second cached data from a second device different from the first device, the second cached data including data saved on the second device in response to electronic searches or electronic messaging performed by the first user using the second device.

11. The system of claim 10, wherein the determining the intended use context comprises detecting an interaction of the first user with the first device or with the second device.

12. A method, comprising:
    obtaining a first cached data from a first device, the first cached data including: a plurality of user searches from a first user for a first product on a website of a merchant or an electronic conversation involving the first user;
    determining, at least in part via the first cached data, an intended use context associated with the user searches or the electronic conversation;
    determining, based on the intended use context, a first confidence level for automatically executing a task; and
    in response to the determined first confidence level meeting or exceeding a predefined first threshold, automatically executing a transaction involving the first product on behalf of the first user.

13. The method of claim 12, wherein the first cached data includes data associated with a particular geographical location and with a particular device type.

14. The method of claim 12, further comprising: providing one or more additional benefits to the first user in association with the automatically executed transaction involving the first product, wherein the one or more additional benefits comprise: an extended cancellation time frame, a reduced shipping fee, or a delayed debiting of an account of the first user for the automatically executed transaction.

15. The method of claim 12, further comprising: detecting that a battery power of the first device has fallen below a predefined battery threshold, and wherein the method further comprises automatically sending an electronic communication on behalf of the first user and in response to the detecting, the electronic communication including a text message, a status update on a social media platform, a chat reply, or a tweet.

16. The method of claim 12, wherein the method further comprises automatically sending, on behalf of the first user, a request to a second user to add the first user to an electronic social network of the first user.

17. The method of claim 12, wherein the automatically executing the transaction comprises:
    executing a dummy transaction that simulates the transaction involving the first product;
    evaluating a result of the executed dummy transaction; and
    executing a real transaction involving the first product in response to the result meeting one or more specified criteria.

18. The method of claim 12, wherein the obtaining the first cached data comprises retrieving cached data from a second device of the first user or retrieving data belonging to a second user who has interacted with the first user electronically.

19. The method of claim 12, wherein the automatically executing the transaction comprises:
    obtaining, from a blockchain system, information pertaining to a future delivery date of the first product;
    monitoring an inventory level of the first product at a merchant;
    detecting, based on the obtained information from the blockchain system and the monitored inventory level, that the next delivery date of the first product exceeds a predefined length of time and that the inventory level of the first product is at or below a predefined inventory level; and
    performing the automatically executing the transaction in response to the detecting.

20. A non-transitory machine-readable medium having stored thereon machine-readable instructions executable to cause a machine to perform operations, comprising:
    obtaining cached data from one or more devices of a first user, the cached data including: one or more searches for a product or an electronic message involving the first user;
    determining, at least in part via the cached data, an intended use context associated with the one or more searches or the electronic message;
    calculating, based on the intended use context, a confidence level for automatically executing a task on behalf of the first user; and
    in response to the calculated confidence level meeting or exceeding a predefined threshold, automatically executing one or more of the following tasks on behalf of the first user without manual involvement from the first user: preparing an order for the product on a website of merchant; or paying a bill.

* * * * *